(No Model.) 3 Sheets—Sheet 1.
F. A. GOFFRAY.
VEHICLE RUNNING GEAR.
No. 405,158. Patented June 11, 1889.
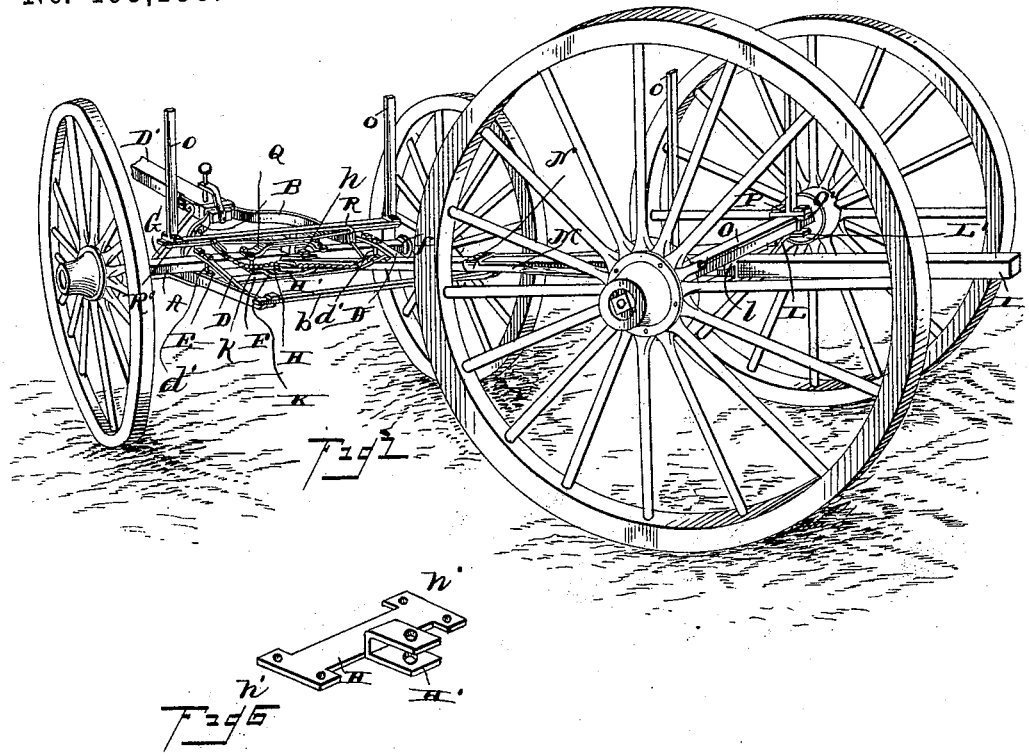
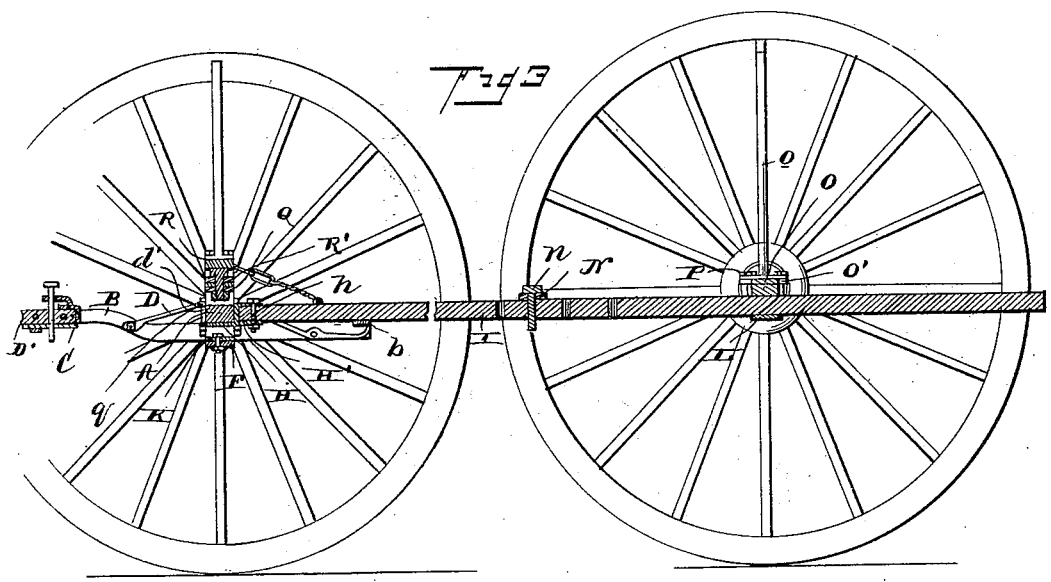
Witnesses
John Imirie
C. E. Dayle
Inventor
F. A. Goffray
By his Attorneys

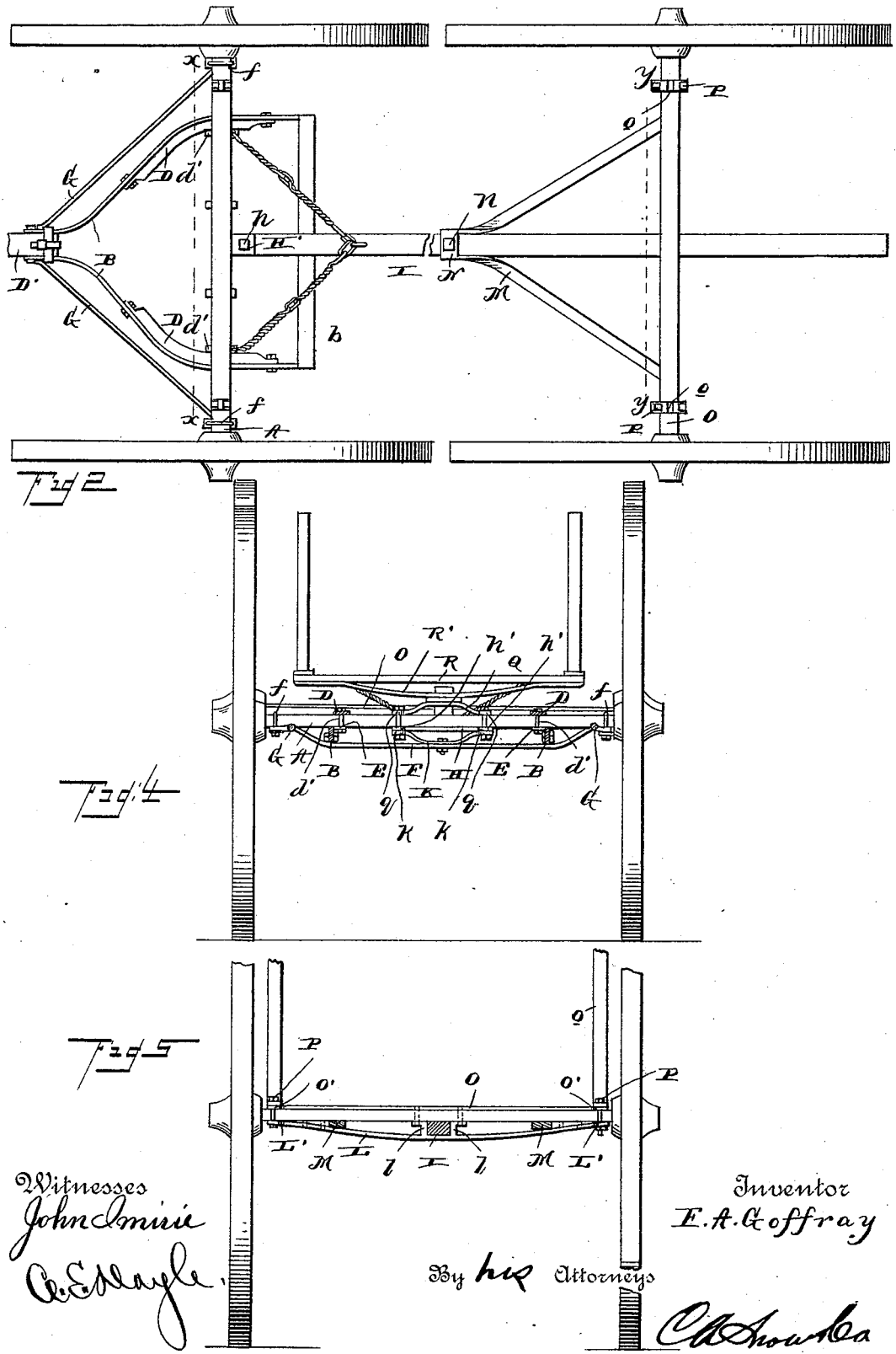

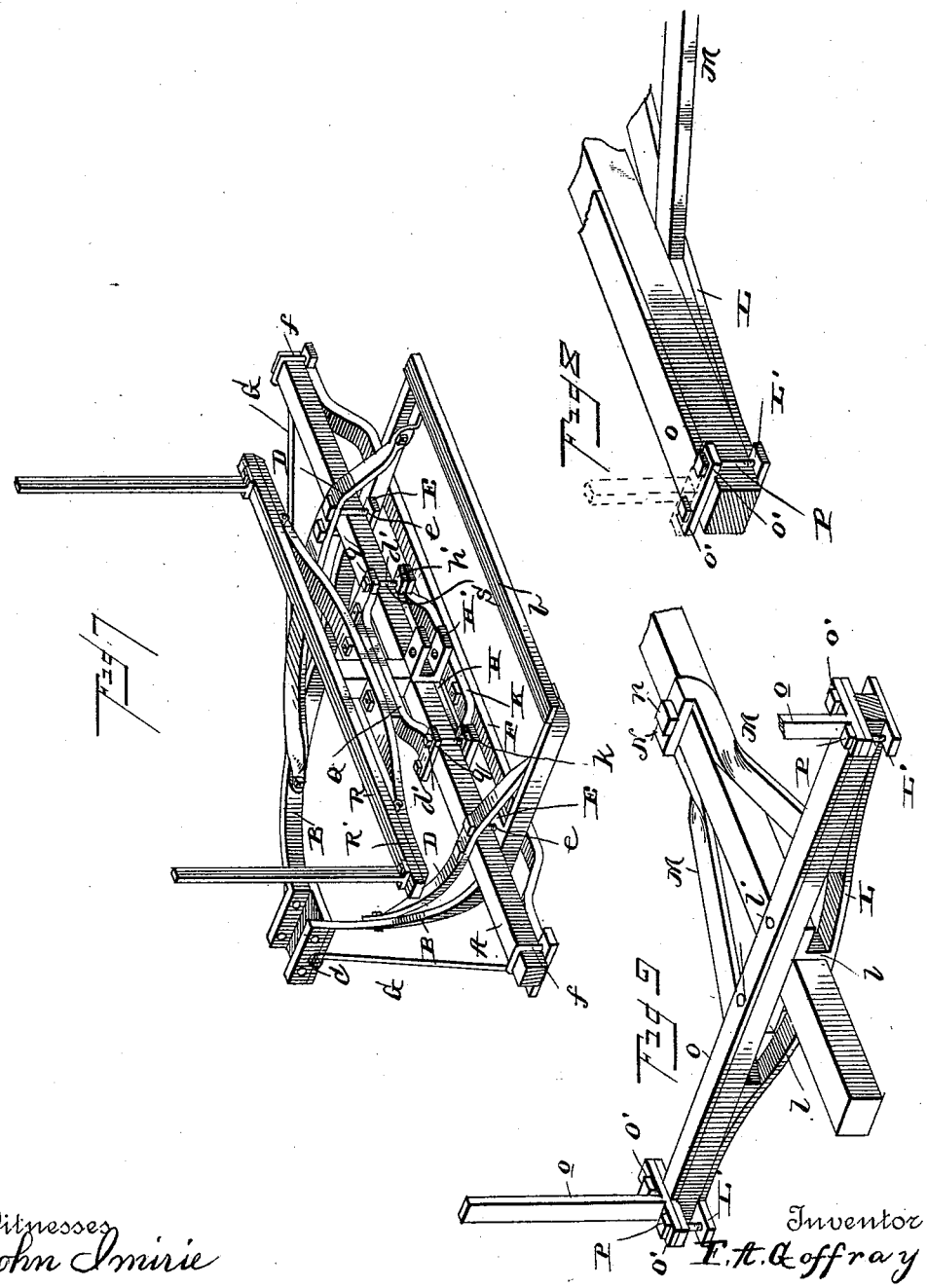

UNITED STATES PATENT OFFICE.

FERDINAND A. GOFFRAY, OF SEWELL, NEW JERSEY.

VEHICLE RUNNING-GEAR.

SPECIFICATION forming part of Letters Patent No. 405,158, dated June 11, 1889.

Application filed December 27, 1888. Serial No. 294,785. (No model.)

*To all whom it may concern:*

Be it known that I, FERDINAND A. GOFFRAY, a citizen of the United States, residing at Sewell, in the county of Gloucester and State of New Jersey, have invented new and useful Improvements in Vehicle Running-Gear, of which the following is a specification.

The invention relates to improvements in vehicle running-gear; and it consists in a certain novel construction and combination of devices, fully described hereinafter in connection with the accompanying drawings, and specifically pointed out in the appended claims.

In the accompanying drawings, Figure 1 is a perspective view of a vehicle-bed showing the improved running-gear. Fig. 2 is a plan view of the same. Fig. 3 is a central longitudinal sectional view. Fig. 4 is a transverse sectional view on the line $x\,x$ of Fig. 2. Fig. 5 is a similar view on the line $y\,y$ of Fig. 2. Fig. 6 is a detail view of the plate secured to the under side of the front axle. Fig. 7 is a detail perspective view of the gearing for the front axle. Fig. 8 is a detail view of the rear axle. Fig. 9 is a detail view of the rear hounds.

Referring by letter to the drawings, A designates the front axle, and B B designate the front hounds, which pass under the axle near its ends and are connected at their rear ends by the cross-bar $b$. The portions of the hounds in front of the axle are curved upward and are connected at their front ends by the horizontal plate C, and the tongue D' is pivoted between the front ends of the hounds and bears on the said plate.

Curved straps D D are secured at their front and rear ends, respectively, to the front and rear portions of the hounds B B, and pass at their centers over the axle, and the said straps are provided with perforations $d\,d$, which register, respectively, with perforations $e\,e$ in lateral ears E E on the hounds. Vertical bolts $d'$ extend through the said registering-perforations on the front and rear sides of the axle, and firmly lock the hounds in place on the axle. A downwardly-bowed axle-brace F is secured at its ends to the under side of the axle by means of clips $f\,f$, and extends under the hounds, and brace-rods G G extend from the front ends of the hounds to the axle near its ends to brace the hounds laterally. These brace-rods are secured by bolts to the brace F.

H designates a small plate secured to the under side of the axle at its center and provided with a rearwardly-extending bifurcated arm H', having a vertical bolt $h$ arranged in its bifurcated ends. The perch I is pivoted at its front end on the bolt $h$ in the bifurcated end of the arm H', and as the said bolt is in rear of the axle the latter is enabled to turn to a very sharp angle with the perch. A small downwardly-bowed brace-plate K is arranged between the center of the axle-brace and the axle, the ends of the said plate being secured to the axle and the center thereof to the axle-brace.

A downwardly-bowed axle-brace L is secured to the under side of the rear axle and is provided at its center with the upwardly-projecting shoulders or ears $l\,l$, which bear at their upper ends against the under side of the axle and are secured thereto by bolts $l'$. The rear end of the perch extends between the rear axle and the axle-brace and bears at its side edges against the shoulders or ears $l\,l$.

The rear hounds M M are secured at their rear ends between the axle and the brace, and are connected at their front ends by the box or guide N, through which the perch extends. A vertical pin or bolt $n$ engages registering-openings in the perch and the box to hold the former in the desired position.

The rear axle-brace is provided at its ends with laterally-extending ears L' L', having perforations, and a top bar O is arranged on the upper side of the axle and provided with similar laterally-extending ears O' O', having perforations which register with the perforations in the ears L' L'. Vertical bolts P pass on opposite sides of the axle and engage the perforations in the said ears, thereby securing the brace L and the top bar O to the axle without perforating the latter. The bolster-standards $o\,o$ are secured to the top bar.

An upwardly-bowed bearing-plate Q is secured to the upper side of the front axle at its center, and the front bolster R is provided on its under side with the downwardly-bowed brace R', which bears on the said bearing-plate. This bearing-plate is provided at its ends with laterally-projecting apertured ears $q\ q$, which extend beyond the front and rear sides of the axle, and the plate H and brace-plate K, the ends of which are arranged under the front axle, are provided, respectively, with lateral apertured ears $h'$ and $k$, the apertures of which register with the apertures in the ears $q\ q$, and vertical bolts S S engage the registering-apertures.

From the above description it will be seen that the front axle is secured in place without forming any perforation therein, and the only perforations in the rear axle are those which receive the bolts from the shoulders or ears $l\ l$.

The main advantage of the construction herein described is that with the same sized wheels the body of wagons is arranged lower than in wagons heretofore constructed. The perch is arranged below the rear axle and is connected to the front axle in such a manner as to permit free movement of the latter, and the front hounds are arranged below the front axle and are curved upward toward their front ends to the proper height for the tongue. All unnecessary cutting or perforating of the parts of the running-gear which are subjected to strains is avoided, thereby enabling the said parts to be constructed lighter than when they are cut or perforated.

Having thus described the invention, I claim—

1. In a vehicle running-gear, the combination, with the axle, of the hounds bearing at intermediate points against the under side of the axle and connected together at their front and rear ends, the straps D, connected at their ends to the hounds in front and rear of the axle and bearing at intermediate points on the upper side of the axle, the vertical bolts $e\ e$, arranged adjacent to the front and rear sides of the axle and engaging registering-perforations in the hounds and straps, and the braces G G, extending from the axle to the front ends of the hounds, substantially as set forth.

2. In a vehicle running-gear, the combination, with the axle A, of the hounds B, extending under the axle and connected at their ends, the straps D, connected at their ends to the hounds, bearing intermediately upon the upper side of the axle and bolted to the hounds at points adjacent to the front and rear faces of the axle, and an axle-brace, as F, clipped at its ends against the lower face of the axle and downwardly bowed between said ends, said hounds being clamped between the lower face of the axle and the upper face of the axle-brace within said downwardly-bowed portion, as and for the purpose set forth.

3. In a vehicle, the combination, with the front axle, of the hounds arranged under the axle, the straps secured to the hounds and extending over the axle, the downwardly-bowed axle-brace secured at its ends to the axle and extending under the hounds, the plate H, arranged under the axle and provided with lateral apertured ears $h'$ and a rearwardly-extending arm H', to which the perch is pivoted, the downwardly-bowed brace-plate K, connecting the center of the front axle-brace to the axle and provided with lateral apertured ears $k\ k$, the bearing-plate Q on the upper side of the axle provided with lateral apertured ears $q\ q$, the vertical bolts S S, engaging the apertures in the ears $k'\ k\ q$ and passing on opposite sides of the axle, and the bolster mounted on the plate Q, substantially as specified.

4. In a vehicle, the combination, with the front axle, of the plate H, arranged on its under side and provided with lateral apertured ears $h'$, extending beyond the front and rear sides of the axle, the perch pivoted to the said plate, and bearing-plate Q on the upper side of the axle provided with corresponding apertured ears $q\ q$, the apertures of which register with the apertures in the ears $h'$, the bolts S S, engaging the said registering-apertures and passing on opposite sides of the axle, and the bolster mounted on the plate Q, substantially as specified.

5. In a vehicle, the combination, with the rear axle, of the downwardly-bowed brace L, provided at its center with the shoulders or ears $l\ l$, between which the rear end of the perch fits, and provided at its ends with the lateral ears L' L', the top bar on the upper side of the said axle having the bolster-standards secured thereto and provided at its ends with lateral ears O' O', and the vertical bolts passing on opposite sides of the axle and engaging registering-apertures in the ears L' and O', substantially as specified.

6. In a vehicle, the combination, with the rear axle, of the downwardly-bowed brace arranged thereunder and provided at its center with shoulders or ears $l\ l$, the top bar O, arranged on the upper side of the axle, carrying the bolster-standards and bolted to the said brace by bolts passing on opposite sides of the axle, the rear hounds attached at their rear ends to the said brace and connected at their front ends by a box or guide N, the perch fitting in the said box or guide and passing between the shoulders or ears $l\ l$ beneath the axle, and the pin $n$, engaging registering-apertures in the box or guide and perch, substantially as specified.

In testimony that I claim the foregoing as my own I have hereto affixed my signature in presence of two witnesses.

FERDINAND A. GOFFRAY.

Witnesses:
FRANK BREWER,
ROBT. M. BURROWS.